No. 736,149. Patented August 11, 1903.

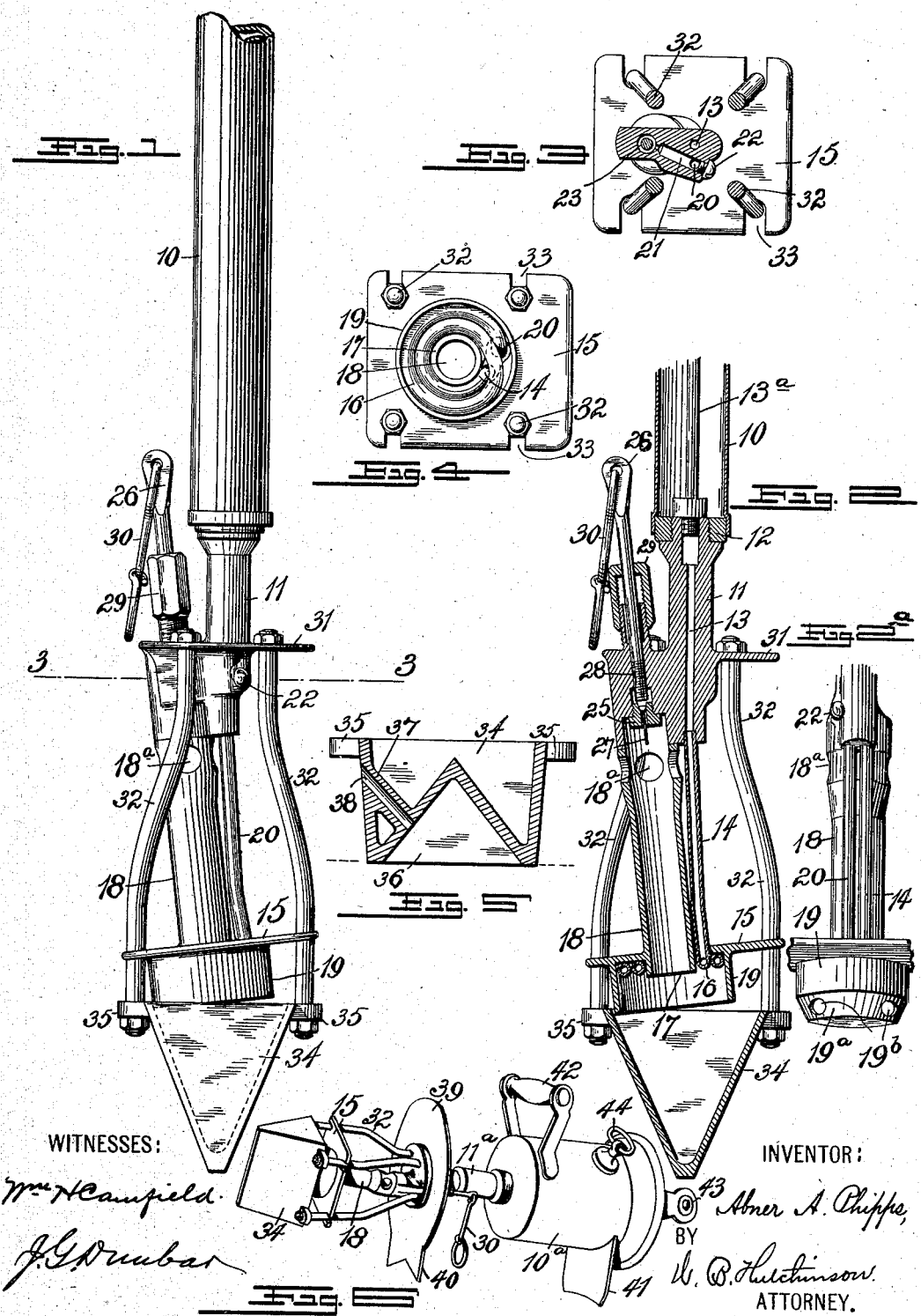

UNITED STATES PATENT OFFICE.

ABNER A. PHIPPS, OF NEW YORK, N. Y.

BRANDING-IRON.

SPECIFICATION forming part of Letters Patent No. 736,149, dated August 11, 1903.

Application filed November 18, 1902. Serial No. 131,832. (No model.)

*To all whom it may concern:*

Be it known that I, ABNER A. PHIPPS, of the city, county, and State of New York, have invented certain new and useful Improvements in Branding-Irons, of which the following is a full, clear, and exact description.

My invention relates to improvements in branding-irons such as are adapted for use in branding live stock, although my invention can also be used for branding boxes and other packages or things.

My invention is especially an improvement on the device shown in my application for Letters Patent of the United States, Serial No. 92,113, filed February 1, 1902. My present application discloses the latest improvements on this invention; and the object of the invention in its present form is especially to cheapen the device, to make it easier to use and more effective in use, to provide means for quick and thorough combustion, to produce a convenient form of wind-guard which will prevent the flame from being blown out and the vaporizer from being cooled, to provide means for preventing the brand from blurring or blistering, and, in general, to simplify and make more efficient the branding-iron referred to.

With these ends in view my invention consists of certain features of construction and combinations of parts, which will be hereinafter described and claimed.

Reference is to be had to the accompanying drawings, forming part of this specification, in which similar figures of reference refer to similar parts throughout the several views.

Figure 1 is a side elevation of my improved branding-iron. Fig. 2 is a detail vertical section of the burner, the brand, and connections. Figure 2ª is a detail view showing the arrangement of the vaporizer-pipes and also a slight modification of the wind-shield. Fig. 3 is a sectional plan on the line 3 3 of Fig. 1. Fig. 4 is an inverted plan view of the wind-shield and vaporizer. Fig. 5 is a detail sectional view of a form of brand or iron in which means is provided for the escape of superfluous heat to prevent injury to the animal being branded, and Fig. 6 is a detail perspective view of an adaptation of the device for certain uses hereinafter referred to.

The invention is provided with a handle 10, which is preferably a reservoir, and while it is preferably small enough to grasp it may be enlarged and provided with supplemental handles, as in Fig. 6, if preferred. The handle has a lower extension 11, which is preferably connected by a screw-joint, as shown at 12, to the reservoir portion of the handle, and the upper part of this extension, which can be a casting, is provided with a longitudinal bore 12, which receives the oil discharged from the pipe 13ª or other equivalent device. I have not shown a means for forcing the oil through the pipe 13ª, as in this invention my claims relate wholly to the burner and its immediate attachments. The lower end of the bore 13 discharges into the pipe 14, of any suitable material, but preferably of copper, which extends downward through the hood 15 and is formed into a coil 16, which lies between the lower projecting end 17 of the mixer 18 and the flanged wind-shield 19. This hood 15, wind-shield 19, and mixer 18 are preferably, though not necessarily, made in a single piece, and the coil 16 is by preference a double coil, though more or less coils can be provided, according to the size of the instrument. The coil 16 discharges into the pipe 20, the parts 14, 20, and 16 being, of course, in a single piece, but differentiated to save confusion, and the pipe 20 leads upward parallel with the pipe 14 and discharges into the cross-bore 21 of the casting 11 and from here passes through a small vent into the bore or chamber 23. The bore 21 is made from the outside of the casting to the chamber or bore 23 for convenience, and the outer end is then plugged by a screw-plug 22 or equivalent.

It will be noticed that the arrangement described is very compact and keeps the vaporizing parts 14, 16, and 20 all close to the mixer 18. The bore or chamber 23 discharges downward through the nipple 25 into the mixer 18, which is provided with suitable air-holes 18ª to promote combustion. The discharge into the mixer is controlled by a needle-valve 26, the point 27 of which extends downward through the nipple 25, so that when the valve is used it opens and closes the nipple and also keeps the latter from becoming clogged. The screw portion 28 of the valve 26 is made to work directly in the casting 11, and the stem of the valve extends upward through a stuffing-box 29, where it connects with a handle 30, which can be of any approved kind, but which is preferably a link, as shown, so that it can hang idly by the side of the tool when not in use.

Near the upper part of the casting 11 is a flange 31, which forms a support for the rods 32, and these extend downward through slots 33 in the hood 15 and finally connect with the ears 35 of the iron or brand 34. In this connection it will be noticed that the hood 15 serves to stiffen and strengthen the rods 32, which are provided with nuts at their ends, and in practice the flange or hood 15 is made of ample size, and in making the tool it is then cut down, so as to be about the size of the top of the iron 34, and the slots 33 are cut in the necessary places. This arrangement is because the irons 34 are seldom of a size, each individual owner of a brand having preferences as to the size and shape of the brand. The hood 15 serves incidentally to stiffen the rods 32, and its chief function is to prevent the rebound of flames from the brand or iron 34 and also prevent the too great influx of air and the consequent cooling of the iron.

It will be noticed that the brands are hollow and that the wind-shield extends well downward to the hollow of the brand, and thus there is little chance for the wind to extinguish the flame. This is important, as in working in the open prairie the wind is usually strong and likely to blow out an ordinary flame. Moreover, it will be seen that the shield also prevents the vaporizing-coil 16 from being suddenly cooled.

In some forms of irons 34 an inner space 36 is left—as, for instance, where the brand makes a triangular or circular mark—and in practice it is found that when the iron is in actual contact with the hide of the animal the space 36 being closed gets so hot that the brand is liable to blur or blister. To obviate this difficulty, I provide a solid boss or connection 37 between the outer and inner walls of the brand and produce an outwardly-inclined bore 38, through which the hot gases may escape. The bore should be outwardly inclined, as otherwise it is likely to discharge the flames on the hair of the animal, and so singe or burn it, and several bores may be provided.

For certain types of brands where it is necessary to have the flame diverted in several directions the style of wind-shield shown in Fig. 2ª is preferably used. Here the shield 19 has an inclined bottom 19ª, in the sides of which are holes 19ᵇ, through which the gases pass and are burned.

In Fig. 6 I have shown an adaptation of the device for stock-yard and analogous uses. This device is in principle and in structure like that already shown except that the reservoir 10ª is larger and the implement is shorter.

The burner part of the implement is connected to the reservoir by the lug 11ª to provide the necessary distance between the burner and reservoir.

The tool is also provided with the disk 39, which is attached to the casting 11 and terminates in the foot 40, while the reservoir is provided with a corresponding foot 41. The reservoir is provided also with the handles 42 and 43 and with the filler-plug 44, which is removed when the reservoir is to be filled.

It will be seen that this tool can be set down upon the ground and still maintain a horizontal position ready for use while still burning and that it can be thus conveniently grasped by the handles 42 and 43 and quickly and conveniently used.

Having thus described my invention, what I claim as new, and desire to secure by Letters Patent, is—

1. In an implement of the kind described, the burner, comprising a mixer, a longitudinal fuel-bore near the mixer, a vaporizing-pipe leading from the fuel-bore into a coil around the discharge end of the mixer and then returning parallel with the mixer and discharging through a valve into one end of the mixer, and a shield inclosing the sides and back of the coil.

2. A device of the kind described, comprising a burner having a vaporizer and mixer, the said vaporizer discharging into the mixer, a branding-iron supported on the burner and receiving the discharge from the mixer, and a wind-shield surrounding the vaporizer and fit tight over the back thereof.

3. A device of the kind described, comprising a reservoir, a burner supported on and receiving the discharge from the reservoir, a branding-iron supported on the burner and receiving the heat therefrom, a vaporizer supplied from the reservoir, a mixer on the burner receiving the discharge from the vaporizer, and a wind-shield surrounding the vaporizer, said shield covering the sides and back of the vaporizer and extending transversely across the mouth of the branding-iron.

4. In a device of the kind described, the combination with the burner having a vaporizer and the branding-iron supported at one end of the burner, of the hood fixed rigidly to the burner at a point near the branding-iron and covering the back and sides of the vaporizer, and supporting-rods extending through the hood and connected to the burner and to the branding-iron.

5. The combination of the burner having the flanged hood, the branding-iron, the mixer of the burner, the wind-shield arranged at the lower end of the mixer and secured to the flanged hood, the rods connecting the burner and the branding-iron and extending through the hood, and the vaporizer of the burner, said vaporizer comprising a pipe receiving the fuel-supply of the burner and formed into a coil within the wind-shield and around the mouth of the mixer, and finally discharging through a valve into the mixer.

6. In a device of the kind described, the brand or iron having a double wall forming a burning-surface inclosing a non-branding space, and a vent leading from the inner space of the branding-iron through both walls thereof.

7. In a device of the kind described, the combination with the burner having a vaporizer and the branding-iron at the lower end of the burner, of the hood supported on the burner and extending across the opening of the branding-iron, said hood covering the back and sides of the vaporizer.

In witness whereof I have signed my name to this specification in the presence of two subscribing witnesses.

ABNER A. PHIPPS.

In presence of—
W. B. HUTCHINSON,
J. G. DUNBAR.